US011287801B2

United States Patent
Oho et al.

(10) Patent No.: US 11,287,801 B2
(45) Date of Patent: Mar. 29, 2022

(54) CONTROL DEVICE, CNC DEVICE, AND CONTROL METHOD

(71) Applicant: FANUC CORPORATION, Yamanashi (JP)

(72) Inventors: Yusaku Oho, Yamanashi (JP); Ryoutarou Tsuneki, Yamanashi (JP); Shinji Okuda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 111 days.

(21) Appl. No.: 16/552,155

(22) Filed: Aug. 27, 2019

(65) Prior Publication Data
US 2020/0081411 A1    Mar. 12, 2020

(30) Foreign Application Priority Data

Sep. 11, 2018 (JP) .............................. JP2018-169921

(51) Int. Cl.
G05B 19/406 (2006.01)
G05B 19/4065 (2006.01)
(Continued)

(52) U.S. Cl.
CPC ..... *G05B 19/4065* (2013.01); *G05B 19/4062* (2013.01); *G06N 20/00* (2019.01)

(58) Field of Classification Search
CPC .................. G05B 19/4065; G05B 19/4062
(Continued)

(56) References Cited

U.S. PATENT DOCUMENTS

2014/0197770 A1* 7/2014 Shimoda ............... H02P 31/00
                                                       318/490
2015/0293523 A1* 10/2015 Yamamoto ............ G06N 20/10
                                                       700/175
(Continued)

FOREIGN PATENT DOCUMENTS

JP    2011-134169    7/2011
JP    2015-203646    11/2015
(Continued)

OTHER PUBLICATIONS

Chen et al. "Toward Intelligent Machine Tool", 2019, Elsevier, p. 1-12. (Year: 2019).*

(Continued)

*Primary Examiner* — Hien D Khuu
(74) *Attorney, Agent, or Firm* — Wenderoth, Lind & Ponack, L.L.P.

(57) ABSTRACT

A control device includes: a machine learning unit that machine-learns a control parameter that determines operating characteristics of a driving unit of a machine serving as a driving target of a motor and sets the control parameter to a motor control device; a health check operation instruction unit that outputs an instruction for a health check operation of driving the motor control device; an operation evaluation unit that acquires information indicating the operating characteristics of the driving unit, calculates an evaluation value on the basis of an evaluation function, and stores the evaluation value in a storage unit; and a deterioration estimation operation unit that estimates deterioration in the operating characteristics of the driving unit of the machine on the basis of the evaluation value stored in the storage unit and the evaluation value calculated by the operation evaluation unit when the health check operation was performed.

7 Claims, 12 Drawing Sheets

(51) Int. Cl.
*G05B 19/4062* (2006.01)
*G06N 20/00* (2019.01)

(58) Field of Classification Search
USPC .......................................................... 700/175
See application file for complete search history.

(56) References Cited

U.S. PATENT DOCUMENTS

| | | | | |
|---|---|---|---|---|
| 2017/0185056 | A1* | 6/2017 | Satou | G05B 13/027 |
| 2017/0293862 | A1* | 10/2017 | Kamiya | G01N 29/14 |
| 2017/0308055 | A1* | 10/2017 | Hoshino | G05B 19/409 |
| 2017/0357243 | A1* | 12/2017 | Takayama | G06N 3/08 |
| 2018/0157226 | A1* | 6/2018 | Okuda | G06N 3/08 |
| 2018/0174658 | A1* | 6/2018 | Kikuchi | G06N 3/084 |
| 2019/0101897 | A1* | 4/2019 | Iijima | G05B 23/0254 |
| 2019/0361421 | A1* | 11/2019 | Tsuda | G06N 3/084 |
| 2019/0386595 | A1* | 12/2019 | Fujita | H02P 21/0014 |
| 2021/0036640 | A1* | 2/2021 | Fujita | H02P 21/14 |

FOREIGN PATENT DOCUMENTS

| | | |
|---|---|---|
| JP | 2016-130908 | 7/2016 |
| JP | 2017-120649 | 7/2017 |
| JP | 2017-188030 | 10/2017 |
| JP | 2018-24055 | 2/2018 |
| JP | 2018-120453 | 8/2018 |

OTHER PUBLICATIONS

Notification of Reasons for Refusal dated Oct. 6, 2020 in corresponding Japanese Patent Application No. 2018-169921, English translation filed Jun. 1, 2021.

* cited by examiner

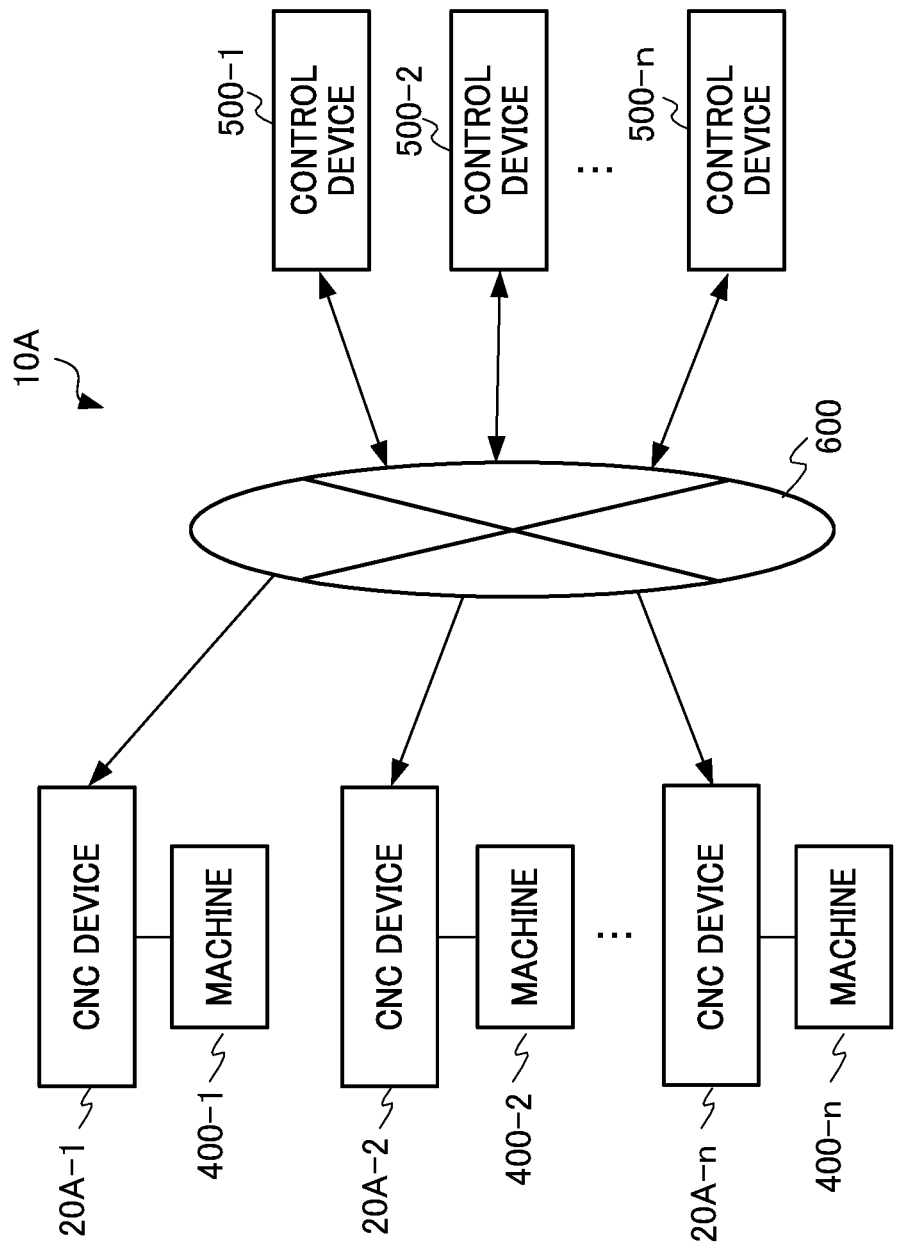

CONTROL DEVICE, CNC DEVICE, AND CONTROL METHOD

This application is based on and claims the benefit of priority from Japanese Patent Application No. 2018-169921, filed on 11 Sep. 2018, the content of which is incorporated herein by reference.

BACKGROUND OF THE INVENTION

Field of the Invention

The present invention relates to a control device that performs a health check operation of driving a motor control device that controls a motor in order to estimate deterioration in operating characteristics of a driving unit of a machine serving as a driving target of a motor and relates to a computerized numerical control (CNC) device which uses the control device and a control method of the control device.

Related Art

A device that detects failures or abnormalities in a machine such as a machine tool or an industrial machine is disclosed in Patent Documents 1 to 3, for example.

Patent Document 1 discloses a machine learning device capable of detecting a symptom of failures before a spindle of a machine tool or a motor that drives the spindle suffers a failure. Specifically, the machine learning device is a machine learning device that learns failure prediction of a spindle of a machine tool or a motor that drives the spindle, including: a state observation unit that observes state variables including at least one of output data of a motor control device that controls the motor, output data of a detector that detects a state of the motor, and output data of a measuring device that measures a state of the spindle or the motor; a determination data acquisition unit that acquires determination data that determines the presence of a failure in the spindle or the motor or the degree of a failure; and a learning unit that learns failure prediction of the spindle or the motor according to a data set created on the basis of a combination of the state variables and the determination data.

Patent Document 2 discloses a failure prediction system which enables failures to be predicted accurately according to a situation. Specifically, the failure prediction system includes a machine learning device that leans conditions associated with failures in an industrial machine. The machine learning device includes: a state observation unit that observes state variables including output data of a sensor, internal data of control software, or computation data obtained on the basis of the output data and the internal data during operation or stopping of an industrial machine; a determination data acquisition unit that acquires determination data indicating the presence of a failure in the industrial machine or the degree of a failure; and a learning unit that learns conditions associated with failures in the industrial machine by supervised learning according to training data set created on the basis of a combination of the state variables and the determination data.

Patent Document 3 discloses an abnormality detection device for detecting abnormalities in a tool of a machine tool with improved diagnosis accuracy. Specifically, the abnormality detection device includes: an acquisition unit that acquires a plurality of measurement values associated with the tool as measurement data (vibration information, cutting force information, sound information, a spindle load, a motor current, a power value, and the like); a normal model unit that leans the measurement data acquired during machining in a normal state by one class of machine learning to create a normal model; an abnormality diagnosis unit that diagnoses whether the measurement data is normal or abnormal on the basis of the normal model while acquiring the measurement data during machining after the normal model is created; and a rediagnosis unit that rediagnoses the measurement data diagnosed to be abnormal by the abnormality diagnosis unit using a method different from that used by the abnormality diagnosis unit.

Patent Document 1: Japanese Unexamined Patent Application, Publication No. 2017-188030
Patent Document 2: Japanese Unexamined Patent Application, Publication No. 2017-120649
Patent Document 3: Japanese Unexamined Patent Application, Publication No. 2018-24055

SUMMARY OF THE INVENTION

Although Patent Documents 1 to 3 disclose devices for detecting failures or abnormalities in a machine tool or an industrial machine by machine learning, since machine learning incurs a large amount of information processing, a certain learning time is required and machine operating efficiency decreases due to machine learning.

An object of the present invention is to provide a control device capable of estimating deterioration in operating characteristics of a driving unit of a machine such as a machine tool or an industrial machine without performing machine learning and to provide a CNC device which uses the control device and a control method of the control device.

(1) A control device according to the present invention is a control device (for example, a control device 500 to be described later) including: a machine learning unit (for example, a machine learning unit 550 to be described later) that machine-learns a control parameter that determines operating characteristics of a driving unit of a machine (for example, a machine 400 to be described later) serving as a driving target of a motor (for example, a servo motor 300 to be described later) and sets the control parameter to a motor control device (for example, a servo control device 200 to be described later) that controls the motor; a health check operation instruction unit (for example, a health check operation instruction unit 510 to be described later) that outputs an instruction for a health check operation of driving the motor control device in order to acquire the operating characteristics of the driving unit; an operation evaluation unit (for example, an operation evaluation unit 520 to be described later) that acquires information indicating the operating characteristics of the driving unit from the motor control device or the machine which is operated on the basis of the instruction for the health check operation, calculates an evaluation value on the basis of an evaluation function which uses the information, and stores the evaluation value in a storage unit (for example, a storage unit 530 to be described later) in association with operation information of the motor or time information during execution of the health check operation; and a deterioration estimation operation unit (for example, a deterioration estimation operation unit 540 to be described later) that estimates deterioration in the operating characteristics of the driving unit of the machine on the basis of the evaluation value stored in the storage unit and the evaluation value calculated by the operation evaluation unit when the health check operation was performed.

(2) In the control device according to (1), the deterioration estimation operation unit may instruct the machine learning unit to machine-learn the control parameter on the basis of an estimation result of the deterioration in the operating characteristics of the driving unit of the machine.

(3) In the control device according to (1) or (2), the deterioration estimation operation unit may instruct a notification unit (for example, a notification unit 560 to be described later) to notify of deterioration in the operating characteristics of the driving unit of the machine on the basis of an estimation result of the deterioration in the operating characteristics of the driving unit of the machine.

(4) In the control device according to any one of (1) to (3), the health check operation instruction unit may output an instruction for the health check operation according to a predetermined schedule or when a predetermined signal is input.

(5) In the control device according to any one of (1) to (4), the health check operation instruction unit may send the instruction for the health check operation to a numerical controller that outputs a control command to the motor control device.

(6) A CNC device according to the present invention is a CNC device including: the control device according to (5); a motor control device that controls a motor; and a numerical controller that outputs a control command to the motor control device on the basis of an instruction for a health check operation output from the control device.

(7) A control method according to the present invention is a control method for causing a control device including a storage unit (for example, a storage unit 530 to be described later) and a machine learning unit (for example, a machine learning unit 550 to be described later) that machine-learns a control parameter that determines operating characteristics of a driving unit of a machine (for example, a machine 400 to be described later) serving as a driving target of a motor (for example, a servo motor 300 to be described later) and sets the control parameter to a motor control device that controls the motor to execute: a health check operation instruction step of outputting an instruction for a health check operation of driving the motor control device in order to acquire the operating characteristics of the driving unit; an operation evaluation step of acquiring information indicating the operating characteristics of the driving unit from the motor control device or the machine which is operated on the basis of the instruction for the health check operation, calculating an evaluation value on the basis of an evaluation function which uses the information, and storing the evaluation value in the storage unit in association with operation information of the motor or time information during execution of the health check operation; and a deterioration estimation step of estimating deterioration in the operating characteristics of the driving unit of the machine on the basis of the evaluation value stored in the storage unit and the evaluation value calculated in the operation evaluation step when the health check operation was performed.

(8) In the control method according to (7), the deterioration estimation step may further include: a machine learning instruction step of instructing the machine learning unit to machine-learn the control parameter on the basis of the estimation result of the deterioration in the operating characteristics of the driving unit of the machine estimated in the deterioration estimation step.

(9) In the control method according to (7), the deterioration estimation step may further include: a notification step of notifying of the deterioration in the operating characteristics of the driving unit of the machine on the basis of the estimation result of the deterioration of the operating characteristics of the driving unit of the machine in the deterioration estimation step.

According to the present invention, it is possible to estimate deterioration in operating characteristics of a driving unit of a machine such as a machine tool or an industrial machine without performing machine learning.

BRIEF DESCRIPTION OF THE DRAWINGS

FIG. 15 is a block diagram illustrating another configuration example of a machine control system.

DETAILED DESCRIPTION OF THE INVENTION

Hereinafter, embodiments of the present invention will be described with reference to drawings.

First Embodiment

Figure 1:
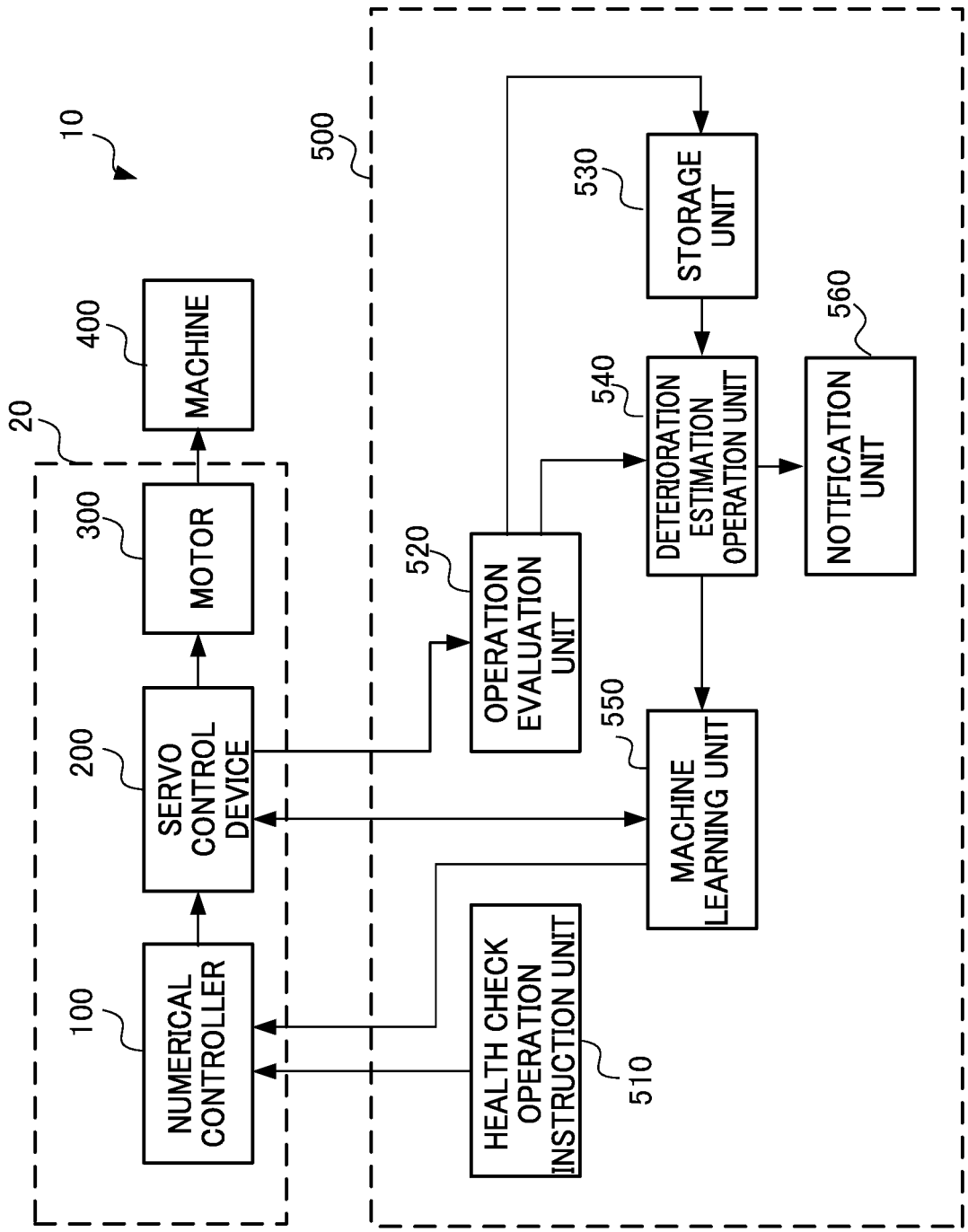
FIG. 1 is a block diagram illustrating a machine control system including a control device of a machine according to a first embodiment of the present invention.
Figure 2:
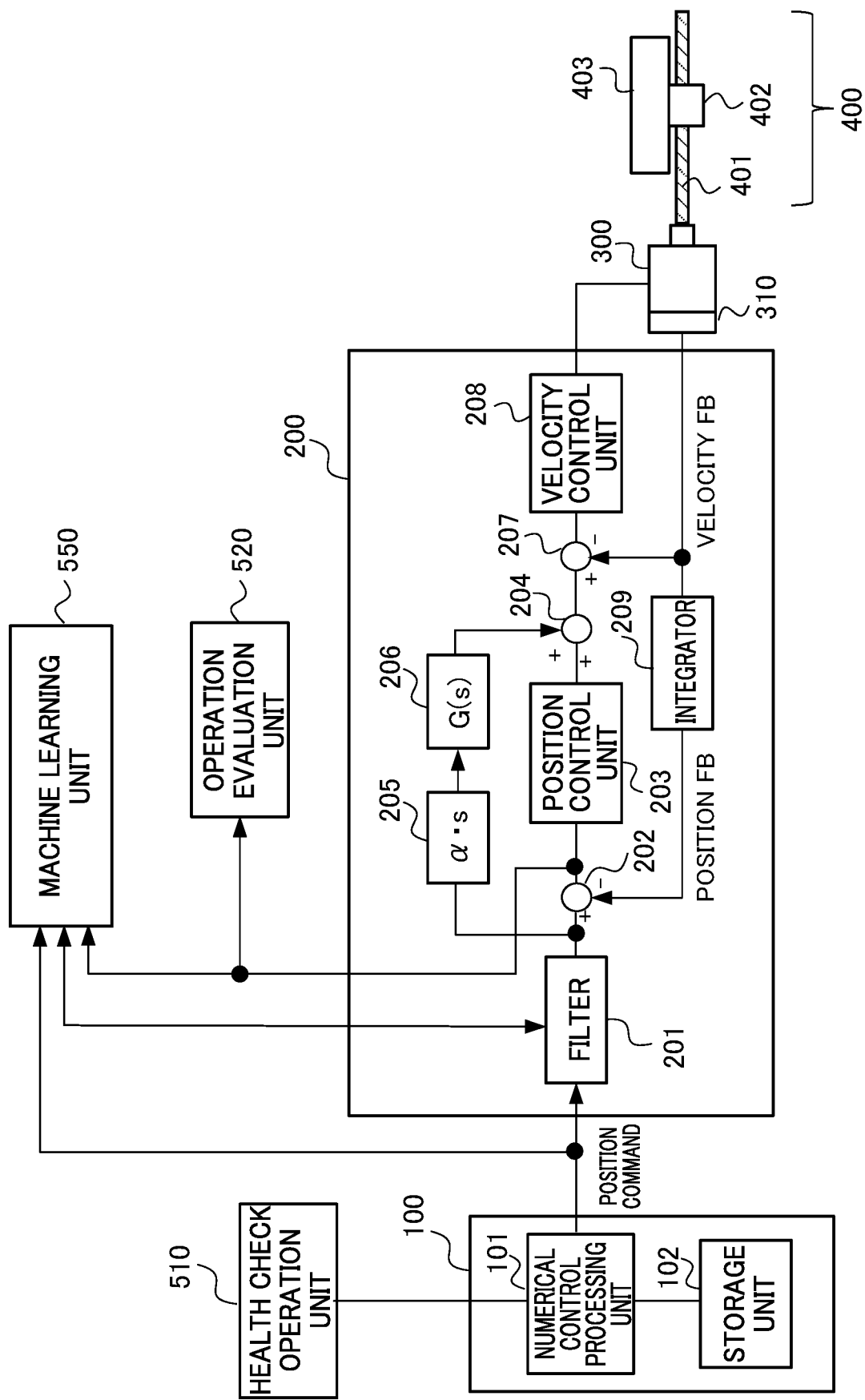
FIG. 2 is a block diagram illustrating a configuration of a numerical controller, a servo control device, and a machine of the machine control system.

FIG. 1 is a block diagram illustrating a machine control system including a control device of a machine according to a first embodiment of the present invention. FIG. 2 is a block diagram illustrating a configuration of a numerical controller, a servo control device, and a machine of the machine control system. As illustrated in FIG. 1, a machine control system 10 includes a numerical controller 100, a servo control device 200, a servo motor 300, a machine 400, and a control device 500. The servo control device 200 is a motor control device. The numerical controller 100, the servo control device 200, and the servo motor 300 form a CNC device 20. The control device 500 may be included in the CNC device 20. The machine 400 is a driving target of the servo motor 300.

First, prior to description of the control device 500, the numerical controller 100, the servo control device 200, and the machine 400 will be described. The numerical controller 100 includes a numerical control processing unit 101 and a storage unit 102. The storage unit 102 stores a machining program for health checking, a machining program for machine learning, and a machining program for actual machining processing. The numerical control processing unit 101 receives an instruction for a health check operation from a health check operation instruction unit 510 of the control device 500, reads a machining program for health checking from the storage unit 102, generates a position command serving as a control command, and outputs the position command to the servo control device 200. Moreover, during machine learning or actual machining processing, the numerical control processing unit 101 receives a machine learning execution instruction from the machine learning unit 550 of the control device 500 or receives a machining execution instruction from an operator, reads a machining program for machine learning or a machining program for actual machining processing from the storage unit 102, generates a position command, and outputs the position command to the servo control device 200. The numerical control processing unit 101 may receive a machine learning execution instruction from the deterioration estimation operation unit 540 instead of the machine learning unit 550.

As illustrated in FIG. 2, the servo control device 200 includes a filter 201, a subtractor 202, a position control unit 203, an adder 204, a differentiator 205, a position feedforward processing unit 206, a subtractor 207, a velocity control unit 208, and an integrator 209. The subtractor 202, the position control unit 203, the adder 204, the subtractor 207, the velocity control unit 208, the servo motor 300, a rotary encoder 310, and the integrator 209 form a position feedback loop. Moreover, the subtractor 207, the velocity control unit 208, the servo motor 300, and the rotary encoder 310 form a velocity feedback loop. The filter 201 is a damping filter that suppresses vibration of the machine 400, and a band-stop filter represented by Expression 1 (indicated by Math. 1 below), for example, is used.

In Expression 1, a coefficient s is a time coefficient which is an argument of an exponential function of Laplace transformation, a coefficient $\omega$ is a cutoff central frequency, a coefficient $\tau$ is a fractional bandwidth, and a coefficient g is g=$\sigma\tau$. When a cutoff central frequency is fc and a cutoff bandwidth is fw, the coefficient $\omega$ is represented by $\omega=2\pi fc$ and the coefficient $\tau$ is represented by $\tau=fw/fc$. The coefficient $\sigma$ is a damping coefficient ($0<\sigma\leq 1$). The coefficients $\omega$, $\tau$, and $\sigma$ of the transfer function of the filter 201 are control parameters used when the servo control device serving as a motor control device determines the operating characteristics of a driving unit of the machine 400.

$$F(s) = \frac{s^2 + 2g\omega s + \omega^2}{s^2 + 2\tau\omega s + \omega^2} \qquad \text{[Math 1]}$$

A position command is input from the numerical control processing unit 101 to the filter 201. In this example, although the filter 201 is provided outside a position feedback loop and a velocity feedback loop, the filter 201 may be provided inside the position feedback loop or the velocity feedback loop. For example, the filter 201 may be connected to an output side of the velocity control unit 208 to be described later or an output side of the adder 204. Although a configuration of the filter 201 is not particularly limited, an IIR filter of the second order or higher is preferably used.

The subtractor 202 calculates a difference between a position command after shaping output from the filter 201 and a position-feedback detection position and outputs the difference to the position control unit 203 and a machine learning unit 550 and an operation evaluation unit 520 to be described later as a position error. The operation evaluation unit 520 performs a health check operation using the position error and the machine learning unit 550 performs machine learning using the position error.

The position control unit 203 outputs a value obtained by multiplying the position error by a position gain Kp to the adder 204 as a velocity command value. The differentiator 205 outputs a value obtained by differentiating the position command values and multiplying the same by a constant $\alpha$ to the position feedforward processing unit 206. The position feedforward processing unit 206 performs a position feedforward process represented by a transfer function G(s) in Expression 2 (indicated by Math. 2 below) on the output from the differentiator 205 and outputs the processing result to the adder 204 as a position feedforward term. Coefficients $a_i$ and $b_j$ (X≥i, j≥0, and X is a natural number) of Expression 2 are coefficients of the transfer function G(s).

$$G(s) = \frac{b_0 + b_1 s + b_2 s^2 + \ldots + b_x s^x}{a_0 + a_1 s + a_2 s^2 + \ldots + a_x s^x} \qquad \text{[Math 2]}$$

The adder 204 adds the velocity command value and an output value (the position feedforward term) of the position feedforward processing unit 206 and outputs an addition result to the subtractor 207 as a feedforward-controlled velocity command value. The subtractor 207 calculates a difference between the output of the adder 204 and a feedback velocity detection value and outputs the difference to the velocity control unit 208 as a velocity error.

The velocity control unit 208 adds a value obtained by multiplying and integrating the velocity error by an integral gain K1$v$ and a value obtained by multiplying the velocity error by a proportional gain K2$v$ and outputs an addition result to the servo motor 300 as a torque command.

A rotation angle position of the servo motor 300 is detected by the rotary encoder 310, and the velocity detection value is input to the subtractor 207 as a velocity feedback (velocity FB). The velocity detection value is integrated by the integrator 209 to be a position detection value, and the position detection value is input to the subtractor 202 as a position feedback (position FB). The servo control device 200 is configured in this manner.

The servo motor 300 is rotated and controlled by the servo control device 200 to drive the machine 400. The machine 400 is a machine tool, an industrial machine, or the like. The servo motor 300 may be included in the machine 400 such as a machine tool or an industrial machine. In FIG. 2, the machine 400 is illustrated as a machine tool and a portion of a machine tool is illustrated. As illustrated in FIG. 2, the machine 400 includes a ball screw 401 connected to a rotary axis of the servo motor 300, a nut 402 threaded to the ball screw 401, and a table 403 connected to the nut 402. The ball screw 401, the nut 402, and the table 403 form the driving unit. With rotation of the servo motor 300, the nut 402 threaded to the ball screw 401 moves in an axial direction of the ball screw 410.

When the table 403 having a workpiece (a work) mounted thereon is moved in an X-axis direction and a Y-axis direction, the servo control device 200 and the servo motor 300 illustrated in FIG. 2 are provided in the machine 400, respectively. When the table is moved in directions of three axes or more, the servo control device 200 and the servo motor 300 are provided in the respective axial directions.

Figure 3:
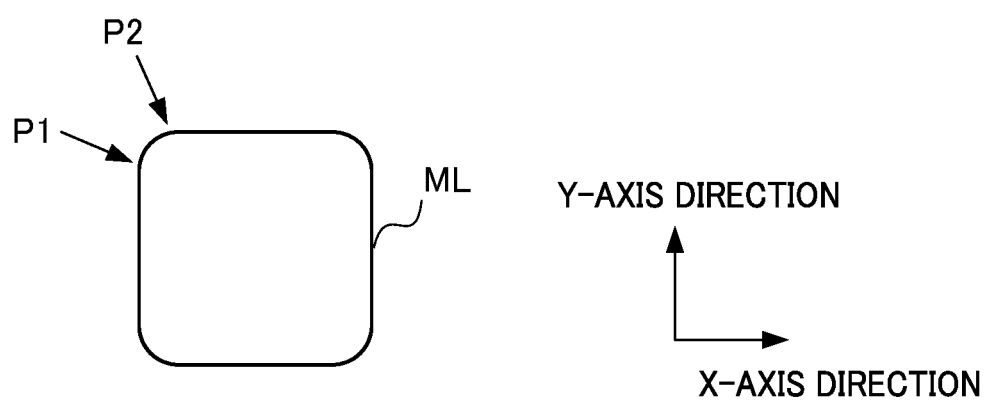
FIG. 3 is a diagram for describing a moving trajectory of a square with quarter arc.

Next, the control device 500 will be described. First, the purpose of a health check operation performed by the control device 500 will be described. Here, a health check operation is an operation of driving a servo control device using a machining program for health checking, acquiring information indicating the operating characteristics of a driving unit of the machine, obtaining an evaluation value on the basis of an evaluation function using this information, and estimating aging deterioration in the machine on the basis of the evaluation value. Although aging deterioration resulting from use of a machine is used as an example of deterioration in operating characteristics, the deterioration is not limited thereto, but the deterioration includes deterioration in operating characteristics occurring due to change in an ambient environment such as a temperature, humidity, or a vibration. The machining program for health checking stored in the storage unit 102 of the numerical controller 100 is such a machining program that the servo control device 200 controls the servo motor 300 so that a moving trajectory ML of characteristic points on the table 403 is a square with quarter arc as illustrated in FIG. 3. In the moving trajectory ML illustrated in FIG. 3, at the position P1, the rotation speed of the servo motor that moves the table in the Y-axis direction decreases as it departs from the position P1 and the rotation stops at the position P2. On the other hand, the servo motor that moves the table in the X-axis direction starts rotating at the position P1 and the rotation speed becomes constant at the position P2. The machining program for health checking is operated in a state in which a work is not mounted on the table 403 and machining of the work is not performed.

Figure 4:
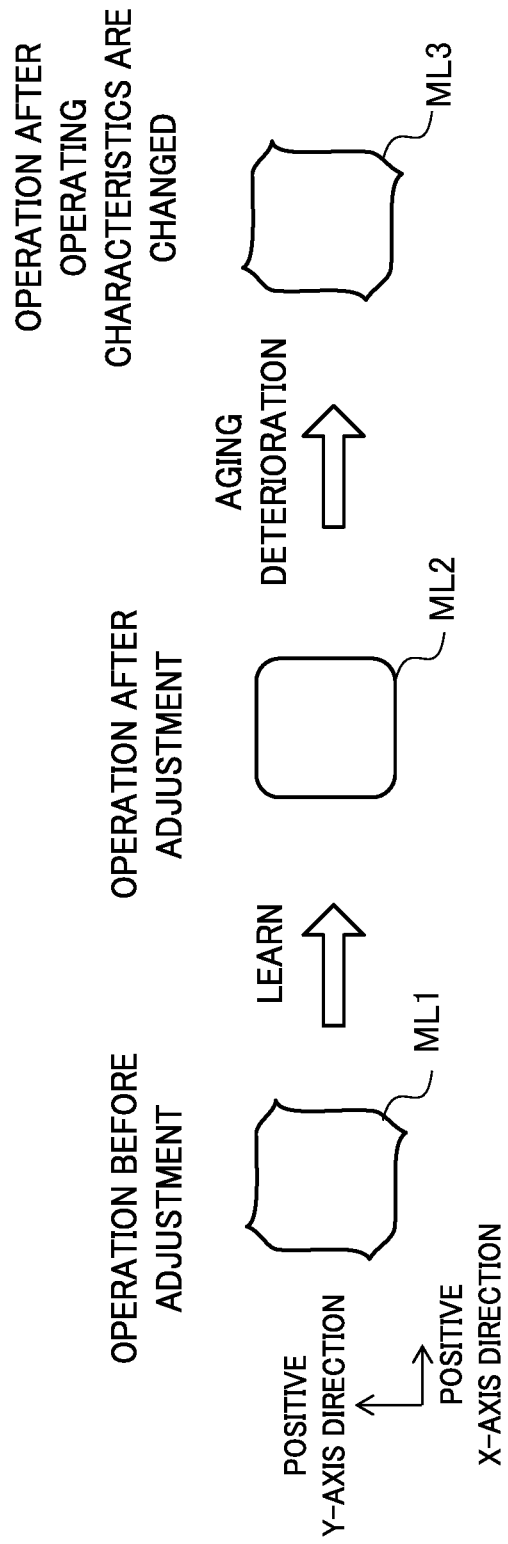
FIG. 4 is a diagram illustrating a moving trajectory of a square with quarter arc when the coefficients $\omega$, $\tau$, and $\sigma$ of a transfer function of a filter of a servo control device are adjusted by machine learning and when aging deterioration of a machine occurs after the adjustment.

FIG. 4 is a diagram illustrating a moving trajectory of a square with quarter arc when the coefficients $\omega$, $\tau$, and $\sigma$ of the transfer function of the filter 201 of the servo control device 200 are adjusted by machine learning and when aging deterioration of the machine 400 occurs after the adjustment. As illustrated in FIG. 4, in a state in which the coefficients $\omega$, $\tau$, and $\sigma$ of the transfer function of the filter 201 of the servo control device 200 are not adjusted, when the servo control device 200 is operated using the machining program for health checking, projections called quadrant glitches are formed in the quarter arcs of the square of a moving trajectory ML1 of the characteristic points on the table 403. Before shipping of the machine 400, the machine learning unit 550 (to be described later) of the control device 500 machine-learns the optimal values of the coefficients $\omega$, $\tau$, and $\sigma$ of the transfer function of the filter 201 of the servo control device 200 and adjusts the coefficients $\omega$, $\tau$, and $\sigma$ of the transfer function to the optimal values so that a moving trajectory ML2 without quadrant glitches is obtained while operating the servo control device 200 using a machine learning program including the machining program for health checking so that quadrant glitches are not formed in the moving trajectory. However, due to aging deterioration resulting from use of the machine 400, vibration or the like occurs in the machine in the state of the coefficients $\omega$, $\tau$, and $\sigma$ of the transfer function of the filter 201, set during shipping, and quadrant glitches occur as in a moving trajectory ML3.

Therefore, the control device 500 estimates aging deterioration of the machine by a health check operation. Moreover, machine learning (referred to as relearning) is performed again on the basis of the estimation result of the aging deterioration to adjust the coefficients $\omega$, $\tau$, and $\sigma$ of the transfer function of the filter 201. The control device 500 may perform a process of sending a notification to an operator or an administrator instead of or together with adjustment of the coefficients of the filter 201 by machine learning on the basis of the estimation result of aging deterioration. Since machine learning incurs a large amount of information processing and a certain learning time is required, if relearning is performed frequently, the machine operating efficiency decreases due to relearning. Moreover, if notification is performed frequently, the burden of the operator or the administrator who monitors the notification increases. Therefore, the control device 500 performs a health check operation so that relearning or notification is performed as necessary.

Next, a configuration and an operation of the control device 500 will be described. As illustrated in FIG. 1, the control device 500 includes a health check operation instruction unit 510, an operation evaluation unit 520, a storage unit 530, a deterioration estimation operation unit 540, a machine learning unit 550, and a notification unit 560.

The health check operation instruction unit 510 sends an instruction for a health check operation to the numerical control processing unit 101 of the numerical controller 100 during activation of the machine 400 or according to an execution instruction from an operator. An activation signal is input to the health check operation instruction unit 510 during activation or an execution instruction signal is input to the health check operation instruction unit 510 when an execution instruction is issued from an operator. The activation signal and the execution instruction signal correspond to a predetermined signal. The health check operation instruction unit 510 may send the instruction for the health check operation to the numerical control processing unit 101 according to a predetermined schedule set by an operator.

Upon receiving the instruction for the health check operation, the numerical control processing unit 101 reads the machining program for health checking from the storage unit 102, generates a position command, and outputs the position command to the servo control device 200. The servo control device 200 rotates and controls the servo motor 300 on the basis of the position command.

The operation evaluation unit 520 acquires a position error e which is the output of the subtractor 202 of the servo control device 200 and calculates an evaluation value $E_A$ using an evaluation function. For example, an evaluation function of Expression 3 or 4 illustrated in below may be used as the evaluation function. Coefficients Ca and Cb in Expression 3 and Coefficients Cc and Cd in Expression 4 are weighting factors. A coefficient $t_0$ in Expression 4 is a time elapsed until the position error e falls within a predetermined range after the velocity command value of the servo motor 300 is changed. The evaluation function is not limited to the evaluation function illustrated in Expression 3 or 4. For example, a time integration of an absolute value of the position error e in Expressions 3 and 4 may be a time integration of a square of the absolute value of the position error e or a largest value of a set of absolute values of the position error e.

$$Ca \times \int |e| dt + Cb \times \int |de/dt| dt \qquad \text{[Math. 3]}$$

$$Cc \times \int |e| dt + Cd \times \int t_0 dt \qquad \text{[Math. 4]}$$

Figure 5:
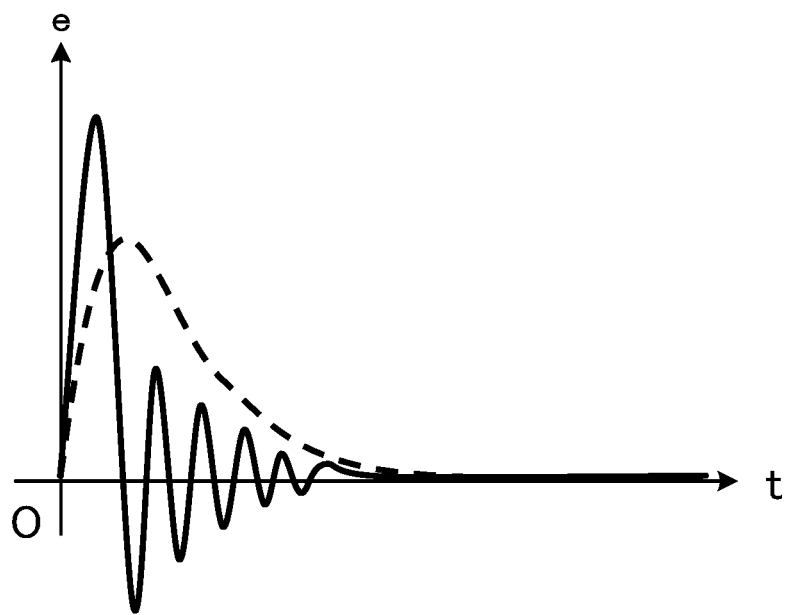
FIG. 5 is a characteristic diagram illustrating an example of a position error e used by an evaluation function of Expression 3.
Figure 6:
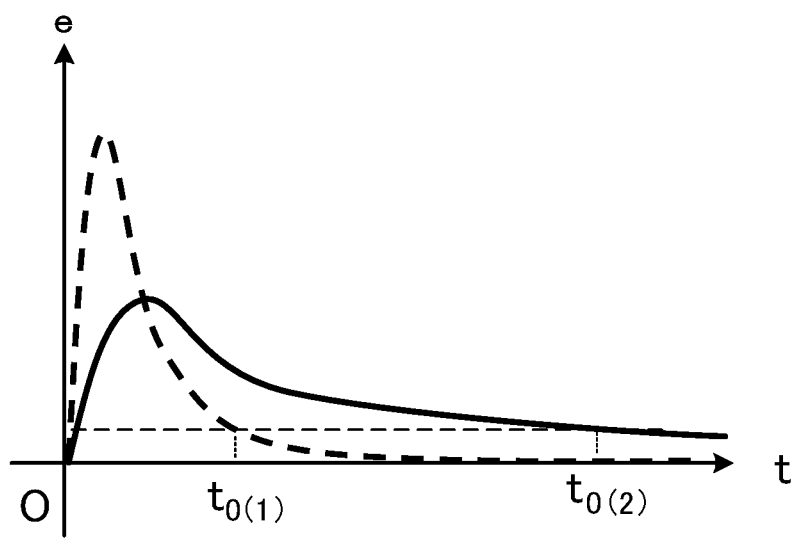
FIG. 6 is a characteristic diagram illustrating an example of a position error e used by an evaluation function of Expression 4.

FIG. 5 is a characteristic diagram illustrating an example of the position error e used by the evaluation function of Expression 3. FIG. 6 is a characteristic diagram illustrating an example of the position error e used by the evaluation function of Expression 4. In the evaluation function of Expression 3, a vibration of a position error indicated by a broken line is smaller than that of a position error indicated by a solid line in FIG. 5, a time integration value of |de/dt| decreases, and an evaluation value decreases. Therefore, the evaluation function is evaluated as a more satisfactory result. In the evaluation function of Expression 4, although an instantaneous error of the position error indicated by a broken line is larger than that of a position error indicated by a solid line in FIG. 6, a stationary error decreases, a time integration value of $t_0$ decreases, and an evaluation value decreases. Therefore, the evaluation function is evaluated as a more satisfactory result. The evaluation value $E_A$ obtained on the basis of Expression 3 or 4 is output to the deterioration estimation operation unit 540 and the storage unit 530.

After machine learning before shipping is performed, the operation evaluation unit 520 stores an evaluation value $E_B$ based on the position error e obtained by operating the servo control device 200 using the machining program for health checking and time information during execution of the health check operation or operation information of the servo motor 300 in the storage unit 530 in correlation. Moreover, after shipping is performed, the operation evaluation unit 520 stores the evaluation value $E_A$ based on the position error e obtained whenever the servo control device 200 is operated using the machining program for health checking and the time information during execution of the health check operation or the operation information of the servo motor 300 in the storage unit 530 in correlation. Moreover, similarly, after relearning is performed, the operation evaluation unit 520 stores the evaluation value $E_A$ based on the position error e obtained whenever the servo control device 200 is operated using the machining program for health checking and the time information during execution of the health check operation or the operation information of the servo motor 300 in the storage unit 530 in correlation.

Figure 7:
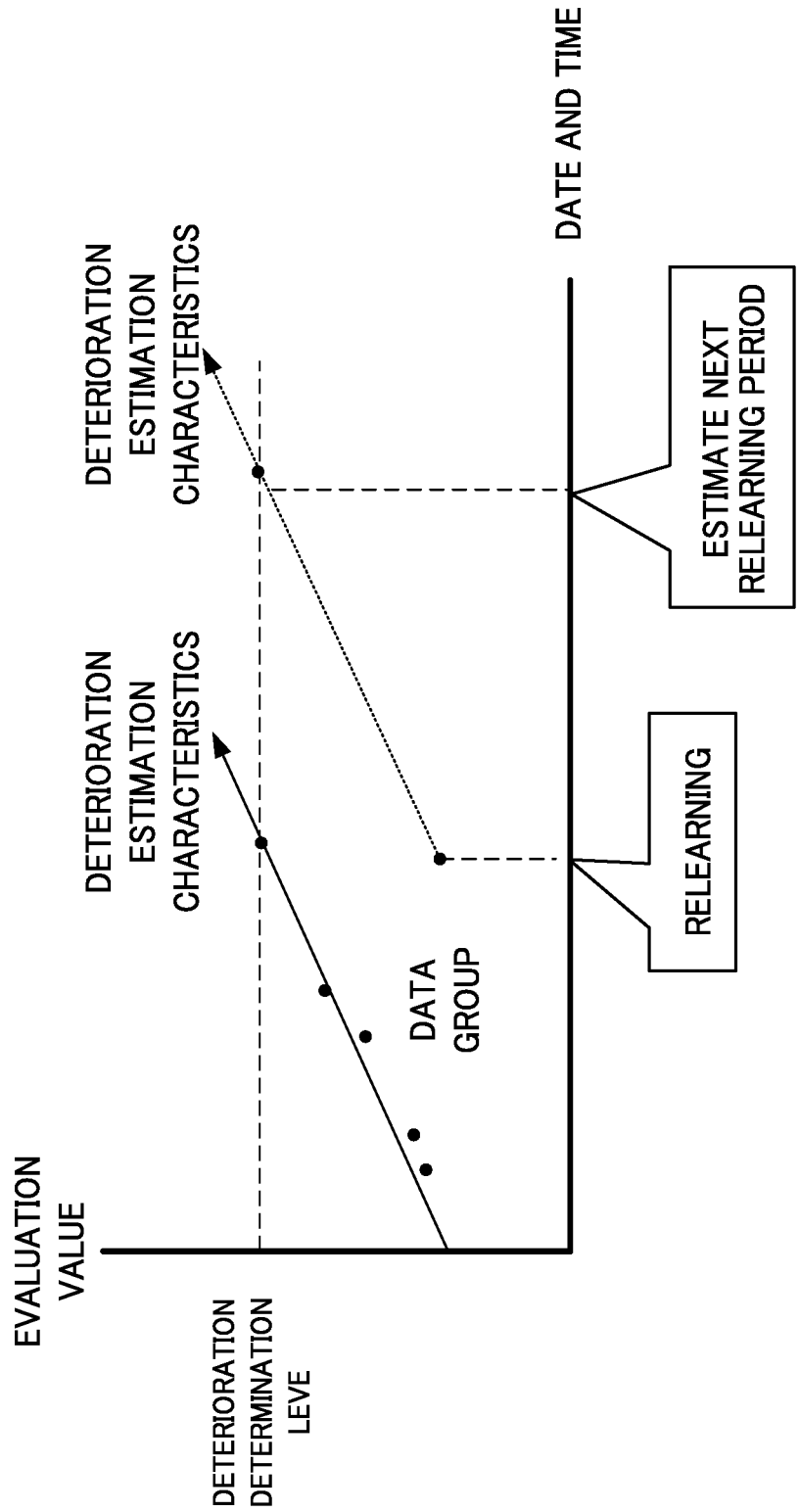
FIG. 7 is a characteristic diagram illustrating a state in which an evaluation value during machine learning before shipping increases due to aging deterioration and a state in which an evaluation value during relearning increases again due to aging deterioration.

The deterioration estimation operation unit 540 acquires the time information during execution of the health check operation and the evaluation value $E_A$ calculated by the operation evaluation unit 520 and the time information and the evaluation value $E_B$ during execution of the health check operation after machine learning before shipping and a set of the time information and the evaluation value $E_A$ during execution of the health check operation after shipping from the storage unit 530 and creates deterioration estimation characteristics (a deterioration estimation characteristic line) as illustrated in FIG. 7 by linear approximation, for example, from the evaluation values $E_B$ and $E_A$ and the time information. Similarly, the deterioration estimation operation unit 540 creates deterioration estimation characteristics (a deterioration estimation characteristic line) after relearning is performed. FIG. 7 is a characteristic diagram illustrating a state in which an evaluation value after machine learning before shipping increases and a state in which an evaluation value during relearning increases again due to aging deterioration. When deterioration estimation characteristics are obtained, an n-th-order curve may be assumed and the coefficients thereof may be determined using a least-squares method to obtain a deterioration estimation characteristics curve. Operation information such as a moving amount of the servo motor 300 may be used instead of the time information during execution of the health check operation.

The deterioration estimation operation unit 540 estimates deterioration in the operating characteristics of the driving unit of the machine 400 using a deterioration estimation characteristic line or a deterioration estimation characteristics curve and instructs the machine learning unit 550 to execute relearning of the control parameters on the basis of the estimation result. Specifically, as illustrated in FIG. 7, the deterioration estimation operation unit 540 estimates a learning period on the basis of the deterioration estimation characteristic line, for example, and sends a machine learning instruction to the machine learning unit 550. Specifically, the deterioration estimation operation unit 540 sends a machine learning instruction (a relearning instruction) to the machine learning unit 550 before a set deterioration determination level is reached (for example, several weeks before a deterioration determination level is reached) on the basis of the deterioration estimation characteristic line of the evaluation value obtained by the health check operation after shipping. The machine learning unit 550 performs relearning at a timing at which the machine 400 does not perform machining. The deterioration determination level can be set appropriately on the basis of a machining state of a work, change in an evaluation value, and the like. The deterioration estimation operation unit 540 calculates a deterioration estimation characteristic line similarly after relearning is performed, estimates the next learning period on the basis of the deterioration estimation characteristic line, and sends a machine learning instruction to the machine learning unit 550. The deterioration estimation operation unit 540 may send a notification instruction to the notification unit 560 instead of or together with sending the machine learning instruction. The deterioration estimation operation unit 540 may send a machine learning instruction to the machine learning unit 550 and may send a machine learning execution instruction to the numerical control processing unit 101 of the numerical controller 100. In this case, the machine learning unit 550 may not send the machine learning execution instruction to the numerical control processing unit 101.

Upon receiving a notification instruction, the notification unit 560 sends a notification to an operator or an administrator by displaying a proposal for inspection or a warning of deterioration on a liquid crystal display or transmitting the same to a mobile terminal via a communication unit. When the machine learning unit 550 performs relearning and does not send a notification to an operator or an administrator, the notification unit 560 may not be provided. An operator having received a notification may send a machine learning instruction to the machine learning unit 550 at a timing at which a machine does not perform machining.

Upon receiving the machine learning instruction, the machine learning unit 550 sends a machine learning execution instruction to the numerical control processing unit 101 of the numerical controller 100. Upon receiving the machine learning execution instruction, the numerical control processing unit 101 reads the machining program for machine learning from the storage unit 102, generates a position command, and outputs the position command to the servo control device 200. The servo control device 200 rotates and controls the servo motor 300 on the basis of the position command. The machine learning unit 550 acquires the position error e which is the output of the subtractor 202 of the servo control device 200, machine-learns the optimal values of the coefficients ω, τ, and σ of the transfer function of the filter 201 of the servo control device 200, and adjusts the coefficients ω, τ, and σ of the transfer function to the optimal values. The details of the machine learning will be described later.

Figure 8:
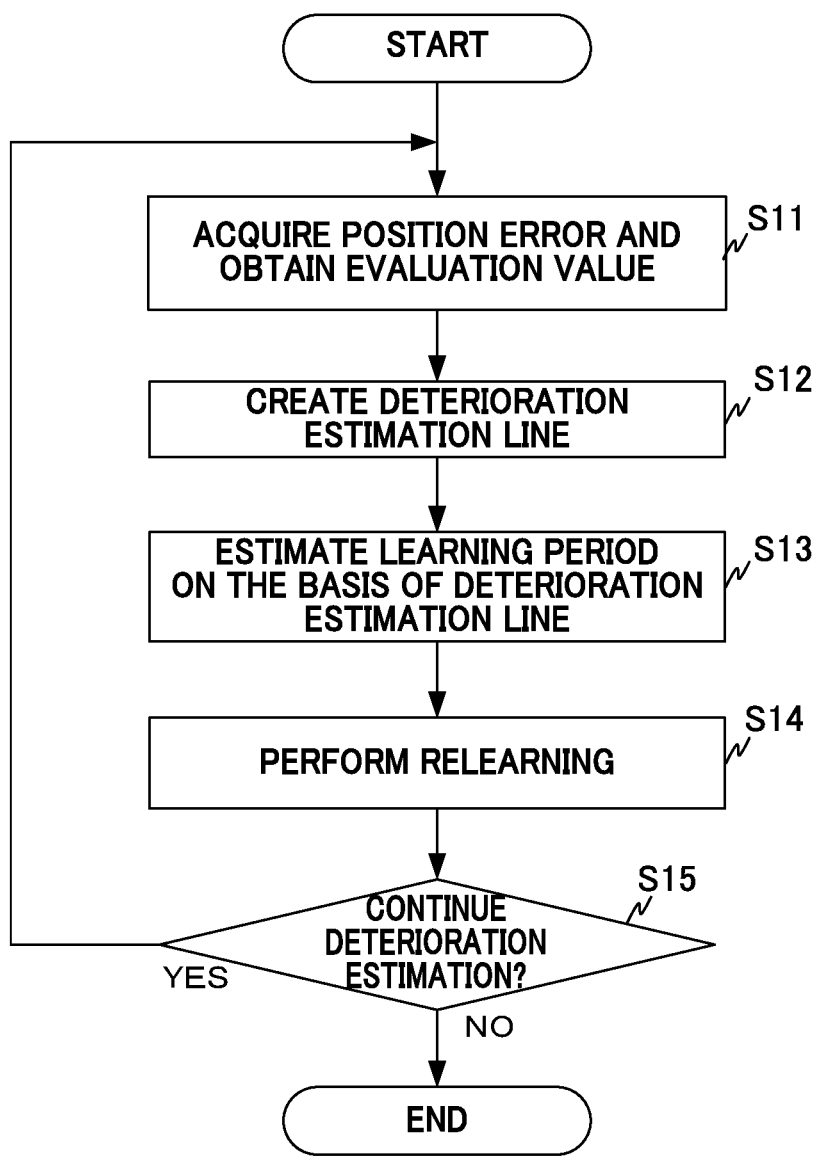
FIG. 8 is a flowchart illustrating an operation of a control device according to the present embodiment.
Figure 9:
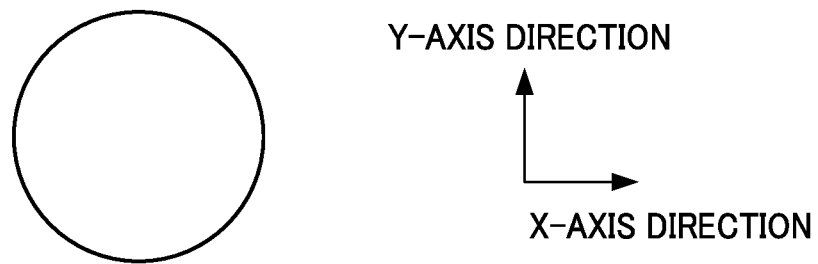
FIG. 9 is a diagram for describing a circular moving trajectory.
Figure 10:
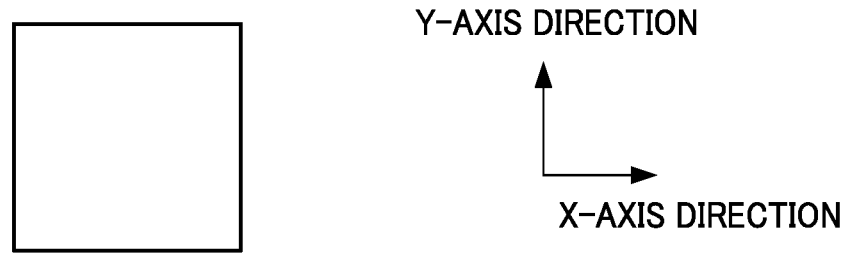
FIG. 10 is a diagram for describing a moving trajectory of a square.

FIG. 8 is a flowchart illustrating a health check operation of the control device 500 according to the present embodiment. First, in step S11, the operation evaluation unit 520 acquires the position error e which is the output of the subtractor 202 of the servo control device 200 driven according to an instruction for the health check operation and calculates the evaluation value $E_A$ using the evaluation function. Subsequently, in step S12, the deterioration estimation operation unit 540 creates deterioration estimation characteristics (a deterioration estimation characteristic line) using the evaluation value obtained after the machine learning before shipping. In step S13, the deterioration estimation operation unit 540 estimates a learning period on the basis of the deterioration estimation characteristic line and sends a machine learning instruction to the machine learning unit 550. In step S14, the machine learning unit 550 performs machine learning on the basis of the machine learning instruction. In step S15, the control device 500 determines whether estimation of the aging deterioration will be continued according to an instruction of an operator or the like. When the estimation is to be continued (step S15: YES), the flow returns to step S11, and the operation evaluation unit 520 waits until the position error e is obtained according to an instruction for a subsequent health check operation. When the estimation of aging deterioration is not to be continued (step S15: NO), the health check operation of the control device 500 ends.

Next, the machine learning unit 550 of the control device 500 will be described.

<Machine Learning Unit 550>

The machine learning unit 550 executes the machining program for machine learning and machine-learns (hereinafter referred to as learning) the coefficients ω, τ, and σ of the transfer function of the filter 201 so that the position error decreases using the position error obtained from the subtractor 202. The machine learning unit 550 is a machine learning device. Although learning by the machine learning unit 550 is performed before shipping, relearning is performed after shipping. Here, the moving trajectory designated by the machining program during learning includes a circle, a rectangle, an octagon, and a star-shape illustrated in FIGS. 9 to 12 in addition to the square with quarter arc illustrated in FIG. 3, for example. Learning is performed in appropriate combination with learning machining programs illustrated in FIGS. 9 to 12. Vibration generated when a rotation direction of the servo motor that moves on the table in the X-axis direction and/or the Y-axis direction is reversed and the servo motor stops from a rotating state according to a moving trajectory designated by such a learning machining program can be evaluated and the influence on the position error can be examined.

When the learning machining programs illustrated in FIG. 3 and FIGS. 9 to 12 are executed during learning, the numerical control processing unit 101 sequentially outputs position command values so that moving trajectories of a square with quarter arc, a circle, a rectangle, an octagon, and a star shape are obtained, for example.

The machine learning unit 550 performs Q-learning of selecting an action a of adjusting the coefficients ω, τ, and σ associated with a servo state S such as commands and feedbacks including the values of the coefficients ω, τ, and σ of the transfer function of the filter 201 and the position error information of the servo control device 200 acquired by executing the learning machining program. As well known to those skilled in the art, an object of the Q-learning is to select an action A having the highest value Q(S,A) as an optimal action among actions A that can be taken in a certain state S.

Specifically, an agent (a machine learning device) learns the correct value Q(S,A) by selecting various actions A under a certain state S and making a better selection of action based on rewards given for the selected actions A.

Moreover, since the agent wants to maximize a total reward obtained in the future, the Q-learning aims to finally attain a relation of $Q(S,A)=E[\Sigma(\gamma^t)r_t]$. Here, E[ ] indicates an expected value, t indicates time, γ is a parameter called a discount factor to be described later, $r_t$ is a reward at time t, and Σ is the sum at time t. In this expression, the expected value is an expected value when the state were changed according to an optimal action. An update expression of such a value Q(S,A) can be represented by Expression 5 below (indicated by Math. 5 below).

$$Q(S_{t+1}, A_{t+1}) \leftarrow Q(S_t, A_t) + \alpha\left(r_{t+1} + \gamma\max_A Q(S_{t+1}, A) - Q(S_t, A_t)\right) \quad [\text{Math. 5}]$$

In Expression 5, $S_t$ indicates an environment state at time t, and $A_t$ indicates an action at time t. By the action $A_t$, the state changes to $S_{t+1}$. $r_{t+1}$ indicates a reward obtained by the change in the state. Moreover, a term with max is a multiplication of the Q value by γ when an action A having the highest Q value known at that moment was selected under the state $S_{t+1}$. Here, γ is a parameter of $0<\gamma\le1$ and is called a discount rate. Moreover, α is a learning coefficient and is in the range of $0<\alpha\le1$. Expression 5 indicates a method of updating a value $Q(S_t,A_t)$ of an action $A_t$ in a state $S_t$ on the basis of a returning reward $r_{t+1}$ when the action $A_t$ is performed.

The machine learning unit 550 observes state information S including a servo state such as commands and feedbacks including the position error information of the servo control device 200 obtained by executing the learning machining program on the basis of the coefficients ω, τ, and σ of the transfer function of the filter 201. The state information corresponds to feedback information. The machine learning unit 505 returns a reward whenever the action A is executed. Here, the reward r is set in the following manner. The reward value is set to a negative value when the state information S is corrected to state information S' by action information A and the value of the evaluation function of the position error e of the servo control device 200 operated on the basis of the coefficients ω, τ, and σ after the correction associated with the state information S' is larger than the value of the evaluation function of the position error e of the servo control device 200 operated on the basis of the coefficients ω, τ, and σ before the correction associated with the state information S before being corrected by the action information A. An evaluation function of Expression 3 or 4 used by the operation evaluation unit 520, for example, can be used as the evaluation function. However, the evaluation function used by machine learning may be an evaluation function different from the evaluation function used by the operation evaluation unit 520.

On the other hand, the reward value is set to a positive value when the value of the evaluation function of the position error e of the servo control device 200 operated on the basis of the coefficients ω, τ, and σ after the correction associated with the state information S' corrected by the action information A is smaller than the value of the evaluation function of the position error e of the servo control device 200 operated on the basis of the coefficients ω, τ, and σ before the correction associated with the state information S before being corrected by the action information A. In Q-learning, the machine learning unit 505 searches in a trial-and-error manner for the optimal action A so that the total of rewards r in the future is maximized. By doing so, the machine learning unit 505 can select an optimal action A (that is, the values of the optimal coefficients ω, τ, and σ of the transfer function of the filter 201) with respect to the state S including a servo state such as commands and feedbacks including the position error information of the servo control device 200 acquired by executing the learning machining program on the basis of the coefficients ω, τ, and σ.

Figure 13:
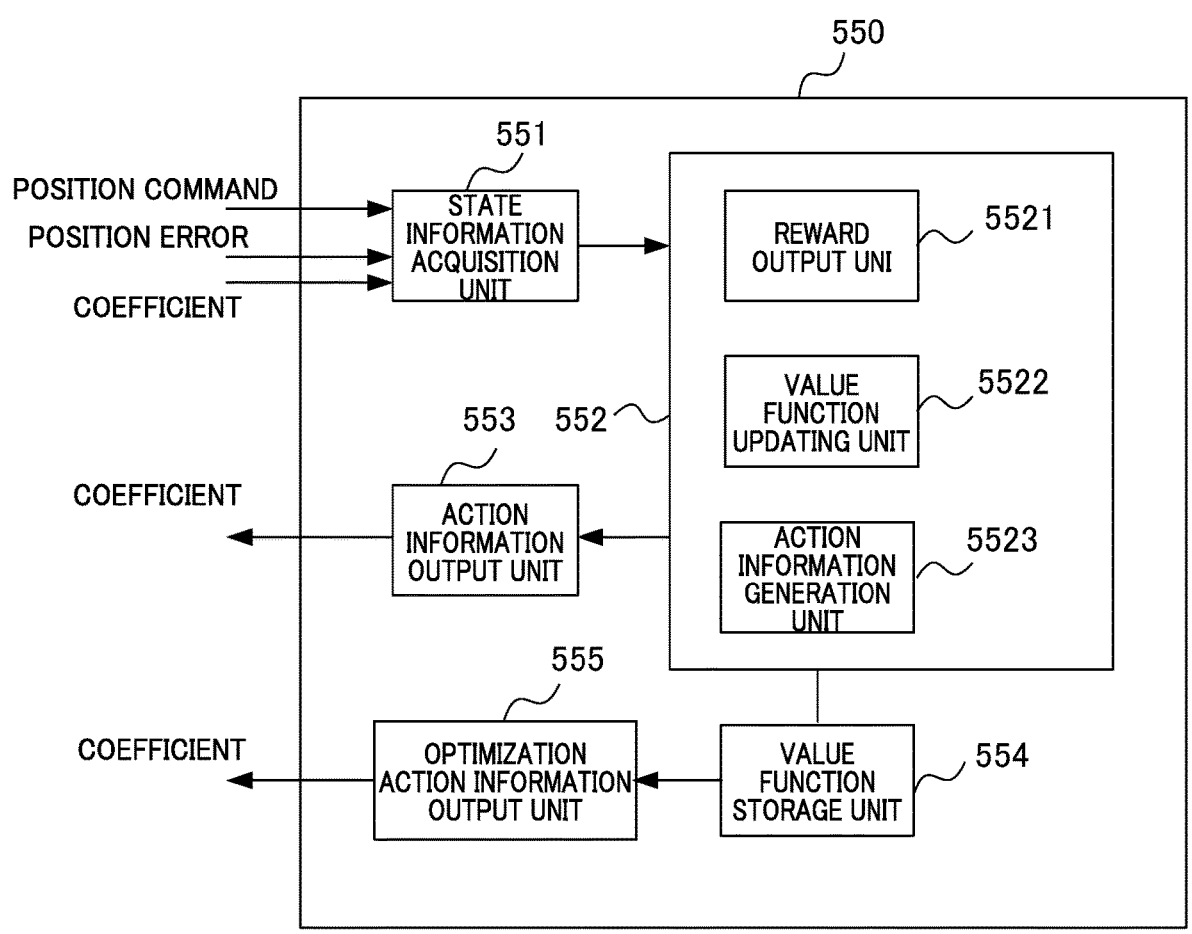
FIG. 13 is a block diagram illustrating a machine learning unit according to the first embodiment of the present invention.

FIG. 13 is a block diagram illustrating the machine learning unit. As illustrated in FIG. 13, in order to perform the reinforcement learning, the machine learning unit 505 includes a state information acquisition unit 551, a learning unit 552, an action information output unit 553, a value function storage unit 554, and an optimization action information output unit 555.

The state information acquisition unit 551 acquires, from the servo control device 200, the state information S serving as the feedback information including commands and feedbacks including the position error information of the servo control device 200 acquired by executing the learning machining program on the basis of the coefficients ω, τ, and σ of the transfer function of the filter 201. The state information S corresponds to an environment state S in the Q-learning. The state information acquisition unit 551 outputs the acquired state information S to the learning unit 552. The coefficients ω, τ, and σ at a time point at which the Q-learning starts initially are generated by a user in advance.

The learning unit 552 is a unit that learns the value Q(S,A) when a certain action A is selected under a certain environment state S. Specifically, the learning unit 552 includes a reward output unit 5521, a value function updating unit 5522, and an action information generation unit 5523.

The reward output unit 5521 is a unit that calculates a reward when the action A is selected under a certain state S. Here, a position error which is a state variable in the state S is denoted by e(S), and a position error which is a state variable associated with the state information S' changed from the state S by the action information A (the correction of the coefficients ω, τ, and σ of the transfer function of the filter 201) is denoted by e(S').

The evaluation function of Expression 3 or 4 the same as the evaluation function used by the operation evaluation unit 520, for example, is used as the evaluation function f.

In this case, the reward output unit 5521 sets the reward value to a negative value when the value f(e(S')) of the evaluation function f when the servo control device 200 is operated on the basis of the filter 201 after the correction associated with the state information S' corrected by the action information A is larger than the value f(e(S)) of the evaluation function f when the servo control device 200 is operated on the basis of the filter 201 before correction associated with the state information S before being corrected by the action information A.

On the other hand, the reward output unit 5521 sets the reward value to a positive value when the value f(e(S')) of the evaluation function f when the servo control device 200 is operated on the basis of the filter 201 after the correction associated with the state information S' corrected by the action information A is smaller than the value f(e(S)) of the evaluation function f when the servo control device 200 is operated on the basis of the filter 201 before correction associated with the state information S before being corrected by the action information A. Moreover, the reward output unit 5521 sets the reward value to zero when the value f(e(S')) of the evaluation function f when the servo control device 200 is operated on the basis of the filter 201 after the correction associated with the state information S' corrected by the action information A is equal to the value f(e(S)) of the evaluation function f when the servo control device 200 is operated on the basis of the filter 201 before correction associated with the state information S before being corrected by the action information A.

Moreover, the negative value may increase according to a proportion when the value f(e(S')) of the evaluation function f of the state S' after execution of the action A is larger than the value f(e(S)) of the evaluation function f in the previous state S. That is, the negative value may increase according to the degree of increase in the value f(e(S')) of the evaluation function f of the state S'. In contrast, the positive value may increase according to a proportion when the value f(e(S')) of the evaluation function f of the state S' after execution of the action A is smaller than the value f(e(S)) of the evaluation function f in the previous state S. That is, the positive value may increase according to the degree of decrease in the value f(e(S')).

The value function updating unit 5522 updates the value function Q stored in the value function storage unit 554 by performing Q-learning on the basis of the state S, the action A, the state S' when the action A was applied to the state S, and the value of the reward r calculated in this manner. The update of the value function Q may be performed by online learning, batch learning, or mini-batch learning. Online learning is a learning method of applying a certain action A to a present state S and updating the value function Q immediately whenever the present state S transitions to a new state S'. Batch learning is a learning method of applying a certain action A to a present state S and repeated attaining transition from the state S to a new state S', collecting learning data, and updating the value function Q using all the collected learning data. Mini-batch learning is a learning method which is intermediate between online learning and batch learning and involves updating the value function Q whenever a certain amount of learning data is collected.

The action information generation unit 5523 selects the action A in the process of Q-learning with respect to the present state S. The action information generation unit 5523 generates the action information A and outputs the generated action information A to the action information output unit 553 in order to perform an operation (corresponding to the action A in the Q-learning) of correcting the coefficients ω, τ, and σ in the process of Q-learning. More specifically, the action information generation unit 5523 outputs the action information A of incrementally increasing or decreasing the coefficients ω, τ, and σ included in the state S, for example. The action information A is correction information of the coefficients ω, τ, and σ.

When the coefficients ω, τ, and σ are increased or decreased, the state S transitions to the state S', and a plus reward (a positive reward) is offered in return, the action information generation unit 5523 may select a policy of selecting such an action A' that further decreases the value of the position error such as incrementally increasing or decreasing the coefficients ω, τ, and σ similarly to the previous action as the next action A'.

In contrast, when a minus reward (a negative reward) is offered in return, the action information generation unit 5523 may select a policy of selecting such an action A' that decreases the position error to be smaller than the previous value such as incrementally decreasing or increasing the coefficients ω, τ, and σ contrarily to the previous action as the next action A', for example.

The action information output unit 553 is a unit that transmits the correction information of the coefficients serving as the action information A output from the learning unit 552 to the filter 201. As described above, the filter 201 finely adjusts the present state S (that is, the presently set coefficients ω, τ, and σ of the transfer function) on the basis of the action information to thereby transition to the next state S' (that is, the corrected coefficients ω, τ, and σ).

The value function storage unit 554 is a storage device that stores the value function Q. The value function Q may be stored as a table (hereinafter referred to as an action value table) for each state S and each action A, for example. The value function Q stored in the value function storage unit 554 is updated by the value function updating unit 5522.

The optimization action information output unit 555 generates the action information A (hereinafter referred to as "optimization action information") for causing the filter 201 to perform an operation of maximizing the value function Q(S,A) on the basis of the value function Q updated by the value function updating unit 5522 performing the Q-learning. The optimization action information includes information that corrects the coefficients ω, τ, and σ of the transfer function of the filter 201 similarly to the action information that the action information output unit 553 outputs in the process of Q-learning.

The servo control device 200 can operate so that the coefficients ω, τ, and σ are corrected on the basis of the coefficient correction information and the position error value is reduced. As described above, by using the machine learning unit 550, it is possible to simplify adjustment of the coefficients ω, τ, and σ of the transfer function of the filter 201 of the servo control device 200.

Hereinabove, the functional blocks included in the numerical controller 100, the servo control device 200, and the control device 500 have been described. In order to realize these function blocks, each of the numerical controller 100, the servo control device 200, and the control device 500 includes an arithmetic processing device such as a central processing unit (CPU). Moreover, the servo control device 200 also includes a sub storage device such as a hard disk drive (HDD) stored with various control programs such as application software and an operating system (OS), and a main storage device such as a random access memory (RAM) for storing data temporarily required for execution of the program by the arithmetic processing device.

In each of the numerical controller 100, the servo control device 200, and the control device 500, the arithmetic processing device reads an application and an OS from the sub storage device, and develops the read application software and OS in the main storage device to perform arithmetic processing on the basis of the read application software and OS. The arithmetic processing device also controls various types of hardware provided in each device based on the arithmetic result. In this way, the functional blocks of the present embodiment are realized. That is, the present embodiment can be realized by cooperation of hardware and software.

Since the machine learning unit 550 involves a large amount of computation associated with the machine learning, graphics processing units (GPUs) may be mounted on a personal computer and be used for arithmetic processing associated with the machine learning using a technique called general-purpose computing on graphics processing units (GPGPUs). In this way, high speed processing can be performed. Furthermore, in order to realize higher-speed processing, a computer cluster may be built using a plurality of computers equipped with such GPUs, and the plurality of computers included in the computer cluster may perform parallel processing.

Second Embodiment

Figure 14:
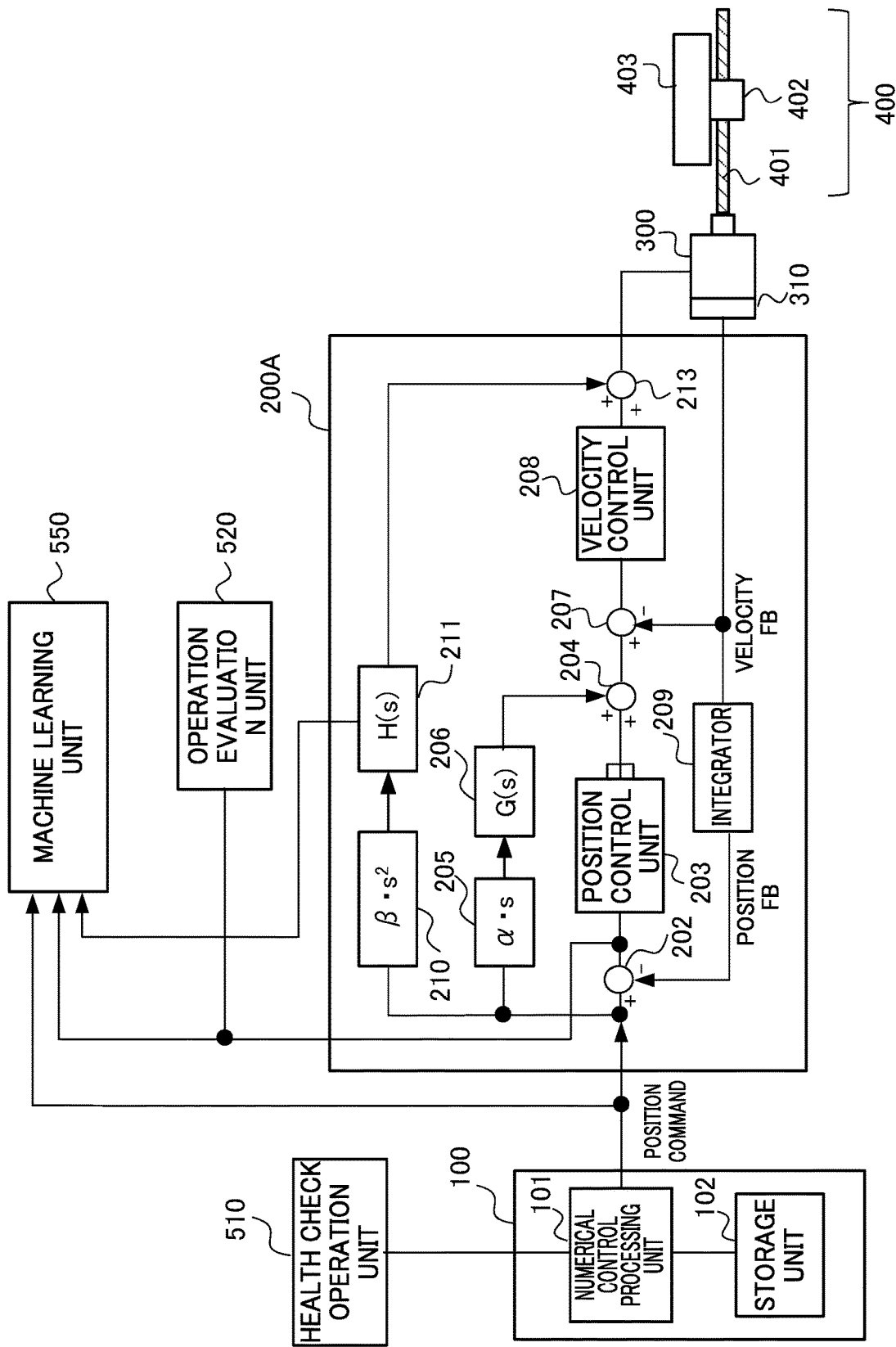
FIG. 14 is a block diagram illustrating a configuration of a numerical controller, a servo control device, and a machine of a machine control system according to a second embodiment of the present invention.

FIG. 14 is a block diagram illustrating a configuration of a numerical controller, a servo control device, and a machine of a machine control system according to a second embodiment of the present invention. The machine control system of the present embodiment has the same configuration as the machine control system 10 illustrated in FIGS. 1 and 2 except the configuration of the servo control device.

A servo control device 200A of the present embodiment does not include the filter 201 but includes a double differentiator 210, a velocity feedforward processing unit 211, and an adder 213 unlike the servo control device 200 illustrated in FIG. 2.

The double differentiator 210 outputs a value obtained by differentiating a position command values and multiplying the same by a constant β to the velocity feedforward processing unit 211. The velocity feedforward processing unit 211 performs a velocity feedforward process represented by a transfer function H(s) indicated by Expression 6 (indicated by Math. 6 below) with respect to the output from the double differentiator 210 and outputs the processing result to the adder 213 as a velocity feedforward term. Coefficients $c_i$ and $d_j$ (X≥i, j≥0, and X is a natural number) in Expression 6 are coefficients of the transfer function H(s).

$$H(s) = \frac{d_0 + d_1 s + d_2 s^2 + \ldots + d_x s^x}{c_0 + c_1 s + c_2 s^2 + \ldots + c_x s^x} \quad \text{[Math. 6]}$$

The machine learning unit 550 executes a learning machining program to learn the values of the coefficients $c_i$ and $d_j$ (i and j≥0) of the transfer function H(s) of the velocity feedforward processing unit 211 so that a position error decreases using the position error obtained from the subtractor 202. Specifically, as described in detail in the first embodiment, the machine learning unit 550 leans a value Q of selecting an action A of adjusting the values of the coefficients $c_i$ and $d_j$ of the transfer function of the velocity feedforward processing unit 211 associated with a servo state S such as commands and feedbacks including the values of the coefficients $c_i$ and $d_j$ (i and j≥0) of the transfer function of the velocity feedforward processing unit 211 of the servo control device 200 and the position error information and the position command of the servo control device 200 acquired by executing the learning machining program.

Figure 11:
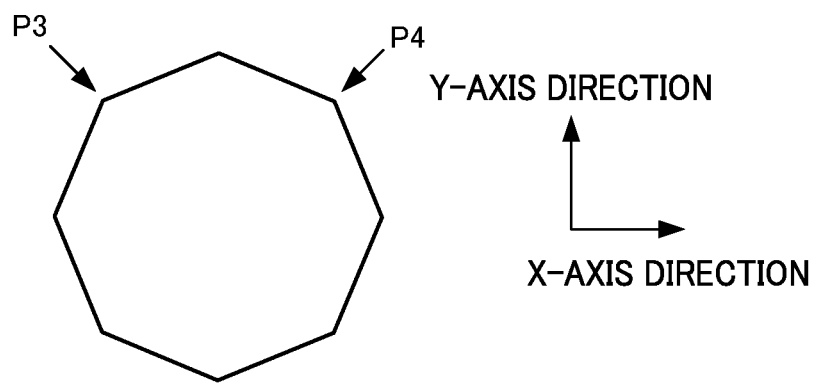
FIG. 11 is a diagram for describing an octagonal moving trajectory.
Figure 12:
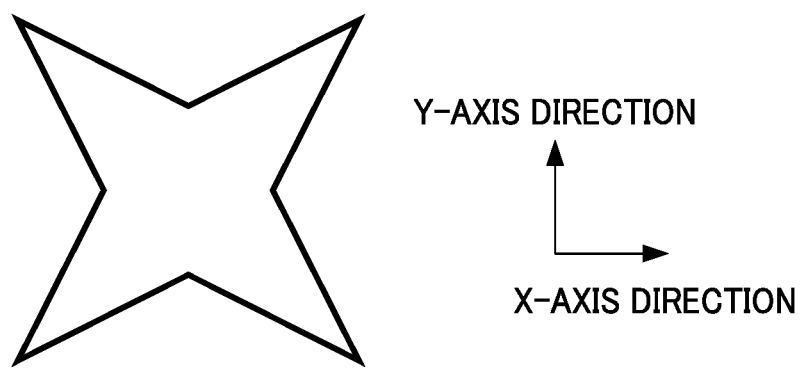
FIG. 12 is a diagram for describing a star-shaped moving trajectory.

Here, the shape of a moving trajectory designated by the learning machining program is an octagon illustrated in FIG. 11, for example. Learning of the coefficients associated with the transfer function H(s) is performed by evaluating vibration when the rotation speed of linear control is changed at the positions P3 and P4 of the moving trajectory illustrated in FIG. 11 and examining the influence on a position error.

In this example, although the machine learning unit 550 learns the values of the coefficients $c_i$ and $d_j$ (i and j≥0) of the transfer function H(s) of the velocity feedforward processing unit 211, the machine learning unit 550 may learn the values of coefficients $a_i$ and $b_j$ (i and j≥0) of the transfer function G(s) of the position feedforward processing unit 206 and may learn both the coefficients of the transfer function H(s) and the coefficients of the transfer function G(s). The coefficients $c_i$ and $d_j$ (i and j≥0) of the transfer function H(s) of the velocity feedforward processing unit 211 and the coefficients $a_i$ and $b_j$ (i and j≥0) of the transfer function G(s) of the position feedforward processing unit 206 are control parameters used when a servo control device serving as a motor control device determines the operating characteristics of the driving unit of the machine 400.

When both the coefficients of the transfer function H(s) and the coefficients of the transfer function G(s) are learned, the machine learning unit 550 preferably performs learning of the coefficients of the transfer function of the velocity feedforward processing unit 211 separately from learning of the coefficients of the transfer function of the position feedforward processing unit 206 and performs learning of the coefficients of the transfer function of the velocity feedforward processing unit 211 on the inner side (the inner loop) than the position feedforward processing unit 206 earlier than the learning of the coefficients of the transfer function of the position feedforward processing unit 206. Specifically, the machine learning unit 505 fixes the coefficients of the transfer function of the position feedforward processing unit 206 and learns the optimal values of the coefficients of the transfer function of the velocity feedforward processing unit 211. After that, the machine learning unit 505 fixes the coefficients of the transfer function of the velocity feedforward processing unit 211 to the optimal values obtained by learning and learns the coefficients of the transfer function of the position feedforward processing unit 206.

By doing so, it is possible to perform learning related to optimization of the coefficients of the transfer function of the position feedforward processing unit 206 under the condition of the velocity feedforward term optimized by learning and to suppress a variation in the position error.

Although a machining program with which the moving trajectory illustrated in FIG. 11 is an octagon can be used as the machining program for health checking according to the present embodiment, another shape may be used as long as it is possible to evaluate vibration when the rotation velocity of linear control is changed. The operation of the control device 500 of the present embodiment is the same as the operation described in the first embodiment.

The components included in the numerical controller, the servo control device, and the control device may be realized by hardware, software or a combination thereof. A servo control method and a control method performed by cooperation of the components included in the servo control device and the control device described above may be realized by hardware, software, or a combination thereof. Here, being realized by software means being realized when a computer reads and executes a program.

The programs can be stored on any of various types of non-transitory computer readable media and be provided to a computer. The non-transitory computer readable media include various types of tangible storage media. Examples of the non-transitory computer readable media include a magnetic recording medium (for example a flexible disk, and a hard disk drive), a magneto-optical recording medium (for example a magneto-optical disk), a CD-ROM (Read Only Memory), a CD-R, a CD-R/W, a semiconductor memory (for example a mask ROM, a PROM (Programmable ROM), an EPROM (Erasable PROM), a flash ROM, and a RAM (Random Access Memory)). Moreover, the programs may be supplied to a computer via various types of transitory computer readable media.

The above-described embodiment is a preferred embodiment of the present invention. However, the scope of the present invention is not limited to the embodiment only but the present invention can be embodied in various modifications without departing from the spirit of the present invention. In the above-described embodiment, although an example in which a servo motor is used as a motor and a servo control device is used as a motor control device has been described, there is no limitation thereto, and for example, a stepping motor may be used as the motor and a control device that does not perform servo control may be used as the motor control device. In the above-described embodiment, although a control device acquires a position error serving as information indicating the operating characteristics of a driving unit of a machine from a servo control device, when the information is acceleration information of a driving unit of a machine, the information may be acquired from an acceleration sensor attached to the machine. That is, the information indicating the operating characteristics of the driving unit of a machine can be acquired from a servo control device or the machine. In the above-described embodiment, although it has been described that the control command output from the numerical controller to the motor control device is a position command, the control command is not limited to the position command but may be a velocity command, for example.

The machine control system may have the following configuration in addition to the configuration illustrated in FIG. 1.

<Modification in which Control Device is Provided Outside CNC Device>

FIG. 15 is a block diagram illustrating another configuration example of a machine control system. A machine control system 10A illustrated in FIG. 15 is different from the machine control system 10 illustrated in FIG. 1 in that n (n is a natural number of 2 or more) control devices 500-1 to 500-*n* are connected to n CNC devices 20A-1 to 20A-n via a network 600. The CNC devices 20A-1 to 20A-n are connected to machines 400-1 to 400-*n*. The CNC devices 20A-1 to 20A-n each have the same configuration as the CNC device 20 illustrated in FIG. 1. The control devices 500-1 to 500-*n* each have the same configuration as the control device 500 illustrated in FIG. 1. The machines 400-1 to 400-*n* each have the same configuration as the machine 400 illustrated in FIG. 2.

Here, the CNC device 20A-1 and the control device 500-1 are paired in a one-to-one relationship and are communicably connected. The CNC devices 20A-2 to 20A-n and the control devices 500-2 to 500-*n* are connected similarly to the CNC device 20A-1 and the control device 500-1. Although n pairs of the CNC devices 20A-1 to 20A-n and the control devices 500-1 to 500-*n* are connected via the network 600 in FIG. 15, the n pairs of the CNC devices 20A-1 to 20A-n and the control devices 500-1 to 500-*n* may be connected directly via connection interfaces, respectively. A plurality of n pairs of the CNC devices 20A-1 to 20A-n and the control devices 500-1 to 500-*n* may be provided in the same plant, for example, and may be provided in different plants.

The network 600 is a local area network (LAN) constructed in a plant, the Internet, a public telephone network, or a combination thereof, for example. A specific communication scheme of the network 600, whether the network uses a cable connection or a wireless connection, and the like are not particularly limited.

<Freedom in System Configuration>

In the above-described modification, although the CNC devices 20A-1 to 20A-n and the control devices 500-1 to 500-n are communicably connected as a one-to-one correspondence, one control device may be communicably connected to a plurality of CNC devices via the network 600 to perform a health check operation and a machine learning of each CNC device. In this case, a distributed processing system may be adopted, in which respective functions of one control device are distributed to a plurality of servers as appropriate. Moreover, the functions of one control device may be realized using a virtual server function, or the like, in a cloud.

When there are n control devices 500-1 to 500-n corresponding to the CNC devices 20A-1 to 20A-n, respectively, of the same type name, the same specification, or the same series, the results of the health check operation or/and the machine learning of the respective control devices 500-1 to 500-n may be shared. By doing so, a more optimal model can be constructed.

EXPLANATION OF REFERENCE NUMERALS

10, 10A: Machine control system
20, 20-1 to 20-n: CNC device
100: Numerical controller
200: Servo control device
300: Servo motor
400, 400-1 to 400-n: Machine
500, 500-1 to 500-n: Control device
510: Health check operation instruction unit
520: Operation evaluation unit
530: Storage unit
540: Deterioration estimation operation unit
550: Machine learning unit
560: Notification unit

What is claimed is:

1. A control device comprising:
a memory configured to store a program; and
a processor configured to execute the program and control the control device to:
machine-learn a control parameter including a coefficient of a transfer function of a damping filter which at least suppresses vibration of a machine, that determines operating characteristics of a driver of a machine serving as a driving target of a motor and set the control parameter adjusted by machine learning by causing a machining program for machine learning to operate as necessary at a timing at which a machine is not performing machining in a motor control device that controls the motor;
output an instruction for a health check operation, causing a machining program for health checking to operate at a timing at which a machine is not performing machining, of driving the motor control device in order to acquire the operating characteristics including at least the position error or acceleration information of the driver;
acquire information indicating the operating characteristics including at least the position error or acceleration information of the driver from the motor control device or the machine which is operated based on the instruction for the health check operation, calculate an evaluation value based on an evaluation function which uses the information, and store the evaluation value in a storage unit in association with operation information of the motor or time information during execution of the health check operation; and
estimate deterioration in the operating characteristics of the driver of the machine based on the evaluation value stored in the storage unit and the evaluation value calculated when the health check operation was performed,
wherein the processor is further configured to instruct the machine-learning of the control parameter based on an estimation result of the deterioration in the operating characteristics of the driver of the machine.

2. The control device according to claim 1, wherein
the processor is further configured to instruct a notifier to notify of deterioration in the operating characteristics of the driver of the machine based on an estimation result of the deterioration in the operating characteristics of the driver of the machine.

3. The control device according to claim 1, wherein
the processor is further configured to output an instruction for the health check operation causing a machining program for health checking to operate without performing machining of a work at a timing at which a machine is not performing machining, according to a predetermined schedule or when a predetermined signal is input.

4. The control device according to claim 1, wherein
the processor is further configured to send the instruction for the health check operation to a numerical controller that outputs a control command to the motor control device.

5. A Computerized Numerical Control (CNC) device comprising:
the control device according to claim 4; the motor control device that controls the motor; and a numerical controller that outputs a control command to the motor control device based on the instruction for the health check operation output from the control device.

6. A control method performed by a computer for causing a control device including a memory configured to store a program and a processor configured to execute the program and control the control device to machine-learn a control parameter including a coefficient of a transfer function of a damping filter which at least suppresses vibration of a machine, that determines operating characteristics of a driver of a machine serving as a driving target of a motor and set the control parameter adjusted by machine learning by causing a machining program for machine learning to operate as necessary at a timing at which a machine is not performing machining in a motor control device that controls the motor, the control device further being controlled by the processor to execute:
outputting an instruction for a health check operation, causing a machining program for health checking to operate at a timing at which a machine is not performing machining, of driving the motor control device in order to acquire the operating characteristics including at least the position error or acceleration information of the driver;
acquiring information indicating the operating characteristics including at least the position error or acceleration information of the driver from the motor control device or the machine which is operated based on the instruction for the health check operation, calculating an evaluation value based on an evaluation function which uses the information, and storing the evaluation value in the memory in association with operation information of the motor or time information during execution of the health check operation; and estimating deterioration in the operating characteristics of the driver of the machine based on the evaluation value stored in the memory and the evaluation value calculated when the health check operation was performed, wherein the estimating further instructs the machine-learning of the control parameter to the processor based on an estimation result of the deterioration in the operating characteristics of the driver of the machine.

7. The control method according to claim 6, wherein the estimating deterioration further includes:

notifying of the deterioration in the operating characteristics of the driver of the machine based on an estimation result of the deterioration of the operating characteristics of the driver of the machine.

* * * * *